US008521707B2

(12) United States Patent
Ahmad et al.

(10) Patent No.: US 8,521,707 B2
(45) Date of Patent: *Aug. 27, 2013

(54) VALIDATING STORED COPIES OF DATA IMAGES TO LOAD INTO MEMORY

(75) Inventors: Said Abdullah Ahmad, Tucson, AZ (US); Michael Thomas Benhase, Tucson, AZ (US); David Frank Mannenbach, Tucson, AZ (US); Tim Stephen Vande Zande, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/444,378

(22) Filed: Apr. 11, 2012

(65) Prior Publication Data
US 2012/0195524 A1 Aug. 2, 2012

Related U.S. Application Data

(63) Continuation of application No. 11/469,811, filed on Sep. 1, 2006.

(51) Int. Cl.
G06F 7/00 (2006.01)
G06F 17/00 (2006.01)

(52) U.S. Cl.
USPC ................................ 707/695; 707/690; 714/2

(58) Field of Classification Search
USPC ...................................... 707/695, 690; 714/2
See application file for complete search history.

(56) References Cited

U.S. PATENT DOCUMENTS 6,424,999 B1 7/2002 Arnon et al.
6,732,123 B1 5/2004 Moore et al.
(Continued)

OTHER PUBLICATIONS

First Office Action dated Jun. 10, 2010, pp. 1-13, for U.S. Appl. No. 11/469,811 by inventors S.A. Ahmad, et al. (18.167).
(Continued)

Primary Examiner — Shew-Fen Lin
(74) Attorney, Agent, or Firm — David W. Victor; Konrad Raynes Davda & Victor LLP

(57) ABSTRACT

Provided are a method, system, and article of manufacture for validating stored copies of data images to load into memory. An image of data is maintained in a memory, wherein the image in the memory includes a generation number. The image in the memory is written to at least two copies of the image to storage locations in response to a first event, wherein the generation number for the image in the memory is stored in the storage locations having the copies of the image. A check generation number is stored in a storage location. The image is loaded from at least one of the copies of the image in one of the storage locations to the memory in response to a second event The generation number for the image loaded into the memory. The check generation number is incremented in response to the second event. The generation numbers for the copies of the image in the storage locations and the check generation number are used to validate the copies of the image.

20 Claims, 5 Drawing Sheets

(56) References Cited

U.S. PATENT DOCUMENTS

| | | | |
|---|---|---|---|
| 6,810,347 B2 * | 10/2004 | Chambers | 702/119 |
| 6,871,271 B2 | 3/2005 | Ohran et al. | |
| 7,024,527 B1 | 4/2006 | Ohr | |
| 2002/0156826 A1 | 10/2002 | Bantz et al. | |
| 2004/0078637 A1 * | 4/2004 | Fellin et al. | 714/6 |
| 2005/0193242 A1 | 9/2005 | Ash et al. | |
| 2006/0122945 A1 * | 6/2006 | Ripberger et al. | 705/71 |
| 2006/0168402 A1 * | 7/2006 | Ahmad et al. | 711/141 |
| 2008/0055644 A1 * | 3/2008 | Ahmad et al. | 358/1.16 |
| 2008/0082757 A1 * | 4/2008 | Ahmad et al. | 711/141 |

OTHER PUBLICATIONS

Response dated Sep. 10, 2010, pp. 1-11 to First Office Action dated Jun. 10, 2010, pp. 1-13, for U.S. Appl. No. 11/469,811 by inventors S.A. Ahmad, et al. (18.167).

Final Office Action dated Apr. 14, 2011, pp. 1-12, U.S. Appl. No. 11/469,811 by inventors S.A. Ahmad, et al. (18.167).

Response dated Jul. 14, 2011, pp. 1-13, to Final Office Action dated Spr. 14, 2011, pp. 1-12, U.S. Appl. No. 11/469,811 by inventors S.A. Ahmad, et al. (18.167).

Notice of Allowance dated Mar. 29, 2012, pp. 1-14, U.S. Appl. No. 11/469,811 by inventors S.A. Ahmad, et al. (18.167).

\* cited by examiner

Check Generation Number

Image Header

VALIDATING STORED COPIES OF DATA IMAGES TO LOAD INTO MEMORY

RELATED APPLICATION

This application is a continuation of U.S. patent application Ser. No. 11/469,811, filed on Sep. 1, 2006, which patent application is incorporated herein by reference in their entirety.

BACKGROUND OF THE INVENTION

1. Field of the Invention

The present invention relates to a method, system, and article of manufacture for validating stored copies of data images to load into memory.

2. Description of the Related Art

During an Initial Microcode Load (IML), a processor may load a copy of the previous data image, including updates and other data, into cache. The processor may have previously stored a copy of the data image during an emergency power-off event or a cold or hard restart. This copy of the data image may be loaded into the memory to restore the system to the state before the power cycle.

In certain dual cluster systems, one cluster may store the data in the other cluster's cache in a non-volatile storage (NVS). The data for the other cluster's cache may be written from the NVS in the other cluster to a dedicated storage device. When one cluster initiates an IML, it may load its cache data image from the storage devices to which the other cluster wrote the cache image. Further, the data image from one cluster maintained in the NVS in the other cluster may be written from the NVS to storage devices for both clusters to provide multiple copies of the data image in both clusters.

SUMMARY

Provided are a method, system, and article of manufacture for validating stored copies of data images to load into memory. An image of data is maintained in a memory, wherein the image in the memory includes a generation number. The image in the memory is written to at least two copies of the image to storage locations in response to a first event, wherein the generation number for the image in the memory is stored in the storage locations having the copies of the image. A check generation number is stored in a storage location. The image is loaded from at least one of the copies of the image in one of the storage locations to the memory in response to a second event. The generation number for the image loaded into the memory. The check generation number is incremented in response to the second event. The generation numbers for the copies of the image in the storage locations and the check generation number are used to validate the copies of the image.

DETAILED DESCRIPTION

Figure 1:
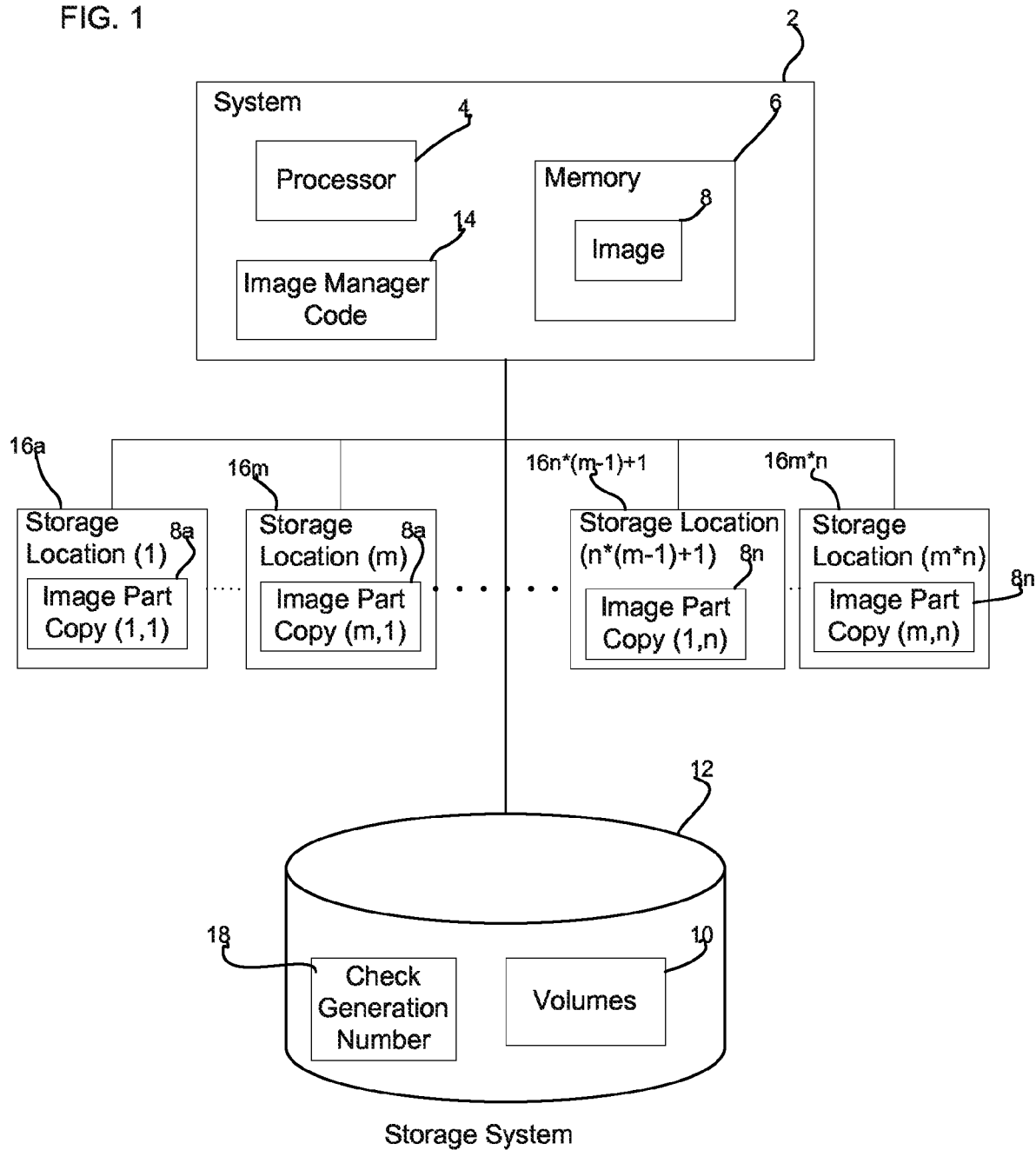
FIG. 1 illustrates an embodiment of a computing environment.

FIG. 1 illustrates an embodiment of a computing environment. A system 2 includes a processor 4 and a memory 6 that has a data image 8. The data image 8 may include updates to volumes 10 in a storage system 12. The image 8 may also include system configuration information. Image manager code 14 includes code that is executed by the processor 4 to manage the image 8 in the memory 6 in response to certain events, such as during a system initialization (e.g., IML) or early power-off warning (e.g., EPOW). For instance, the image manager code 14 may be implemented in the initial Microcode Load (IML) code or the early power-off warning (EPOW) code that is executed.

To manage the image 8, the image manager code 14 may store copies of the image within storage locations. In one embodiment, the image manager code 14 may store multiple copies of the entire image 8 into one or more storage locations. In another embodiment, the image manager code 14 may divide the image 8 into image parts 8a ... 8n, where n may he any integer greater than or equal to two. The copies then comprise the m copies of each image part 8a ... 8n stored in the storage locations 16a ... 16(m*n). There may be one or more (m) copies of the image parts 8a ... 8n. Each storage location 16a .... 16(m*n) may comprise a separate non-volatile storage device, such as a disk drive, non-volatile electronic storage device (e.g., a Flash Memory, battery backed up Random Access Memory (RAM), etc.) or other suitable non-volatile storage medium. For instance, each of the m copies of an image part 8a ... 8n may be stored in one of the m*n storage locations, where only one copy of one image part 8a ... 8n is stored in one storage location, i.e., each storage location is dedicated to one image part copy. In this way, if the storage locations comprise separate storage devices where each storage device includes only one copy of one image part, then one image part 8a ... 8n may be recovered from multiple storage locations.

The storage 12 may comprise a single storage device or an array of storage devices, such as a Just a Bunch of Disks (JBOD), Direct Access Storage Device (DASD), Redundant Array of Independent Disks (RAID) array, virtualization device, tape storage, flash memory The image manager code 14 may maintain a mapping of each image part copy (i, j), where i indicates the copy number and j is the image part, and the storage location storing that particular image part copy (i, j). As discussed, in one embodiment, there may be multiple image parts 8a ... 8n if the image 8 is divided. Alternatively, the image part may comprise the entire image 8, where multiple copies of the entire image 8 are stored in multiple storage locations.

The image manager code 14 writes a generation number for the image 8 in the memory 6 to a check generation number 18 value stored in the storage system 12 or some other storage location. Further, a copy of the generation number is stored with each copy of the image part (i,j) stored in a storage location 16a ... 16(m*n).

Figure 2:
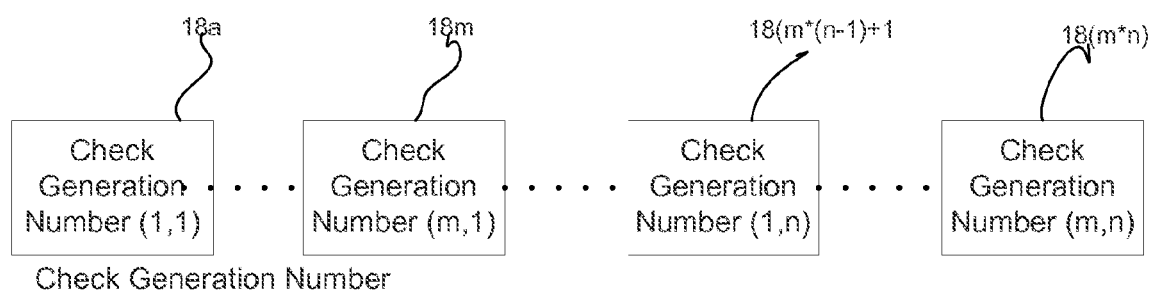
FIG. 2 illustrates an embodiment of check generation number.

FIG. 2 illustrates an embodiment of the check generation number 18 stored in the storage system 12 as including a separate check generation number 18a ... 18(m*n) for each image part cops (i, j), where there is one check generation number (i, j) for each image part copy (i, j), where "i" indicates the copy number of to copies and "j" indicates one of the n image parts. In an alternative embodiment, there may not be a separate check generation number for each image part copy (i, j), and instead there may be one or more check generation numbers for multiple image part copies.

Figure 3:
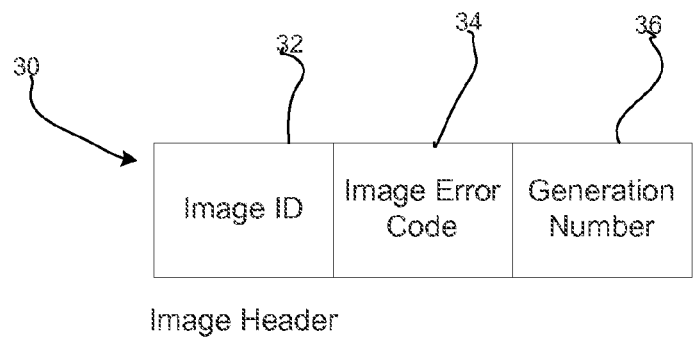
FIG. 3 illustrates an embodiment of an image header.

FIG. 3 illustrates an embodiment of an image header 30 that may be included in the image 8 in the memory 6 and in each image part copy stored in a storage location 16a . . . 16(m*n), where an image part comprises a portion or the entire image 8. The image header 30 includes an image identifier 32, an image error code 34, such as an error correction code for the image header 30 and image part, and a generation number 36 for the image part 8 or 8a . . . 8n. In an alternative embodiment, the header information 30 and/or generation number 36 may be stored separately from the image part 8, 8a . . . 8n, but may be stored in the same storage location storing the image part 8a . . . 8n or image 8.

Figure 4:
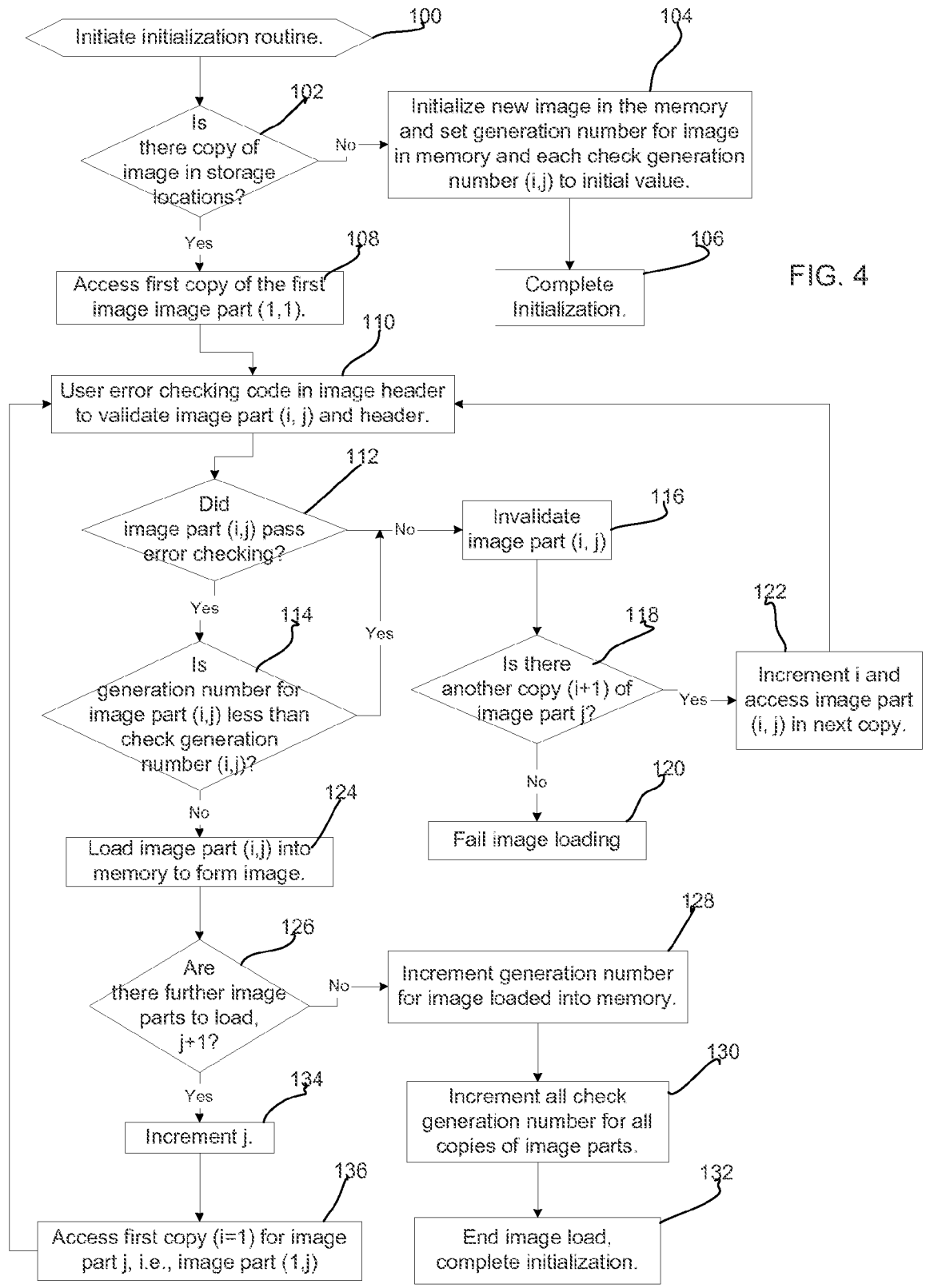
FIG. 4 illustrates an embodiment of operations to load an image into memory.

FIG. 4 illustrates an embodiment of operations performed by the image manager code 14, which may be code that is part of the system initialization code or IML. Upon initiating (at block 100) system initialization, if (at block 102) there is no stored copy of image parts in storage locations 16a . . . 16(m*n), then the image manager code 14 initializes (at block 104) a new image 8 in the memory 6 and sets the generation number 36 for the image 8 in the memory 6 to an initial generation number value, where the generation number 36 may be included in the image 8 header 30. The check generation number (i,j) for each copy i and image part j that will be created is set to the initial generation number. After setting the generation number for the image 8 and the check generation numbers, the initialization routine may then continue (at block 106) until completion.

If (at block 102) there are stored image part copies (i, j) in the storage locations 16a . . . 16(m*n), then the image manager code 14 accesses (at block 104) the first copy (i=1) of the first image part (j=1), i.e., image part copy 16a. The error checking code 34 in the image header 30 for the accessed image part copy (i, j) is then used (at block 110) to validate the image part (i, j) and its header 30. If (at block 112) the image part copy (i,j) is validated using the image error code 34, then a determination is made (at block 114) as to whether the generation number 36 for image part copy (i,j) is less than the check generation number (i, j) in the storage system 12. If (at block 114) the generation number 36 for the image part copy (i,j) is less than the check generation number (i,j), then the image part copy (i,j) in the storage location has become outdated, as indicated by the higher check generation number (i, j), perhaps as a result of the storage location having the image part copy (i, j) being unavailable during the last update of the image part copy (i, j).

If (at block 112) the image part copy (i,j) did not pass the error checking code 34 or its generation number 36 indicated (from the yes branch of block 114) that the image part (i,j) was outdated, then the image part copy (i,j) in the storage location is invalidated (at block. 116). If (at block 118) there is no additional copy (i+1) of image part j, then the image part j cannot be recovered and the image loading will fail (at block 120). Otherwise, if (at block 118) there is an additional copy (i+1) of the image part j, then "i" is incremented (at block 122) and the next image part (i, j) is accessed to consider. Control proceeds back to block 110 to validate the next copy of the image part (i, j). If (at block 114) the image part copy (i, j) is current, i.e., the generation number 36 for the image part copy (i, j) is equal to the corresponding check generation number (i, j), then that image part copy (i,j) is loaded (at block 124) into the memory 6.

If (at block 126) there are no further image parts, e.g., j+1, that need to be loaded into the memory 6 to complete the image 8, then the image manager code 14 increments (at block 128) the generation number 36 for the complete image 8 loaded into the memory 8, where the generation number 36 may be maintained in the image header 30 for the entire image 8. The check generation numbers 18a . . . 18(m*n) for all image part copies (1,1) . . . (m,n) are incremented (at block 130) and the image load completes (at block 132) and the initialization may continue. At this point, the generation number of the image 8 in the memory 6 and the check generation numbers for the image are greater than the generation numbers 36 included with the image part copies (i, j) in the storage locations 16a . . . 16(m*n).

If (at block 126) there are further image parts, e.g., j+1 to load, then "j" is incremented (at block 134) and the image manager code 14 accesses (at block 136) the first copy (i=1) for image part j, i.e., image part (1,j) and proceeds back to block 110 to validate the next image part j to load.

Figure 5:
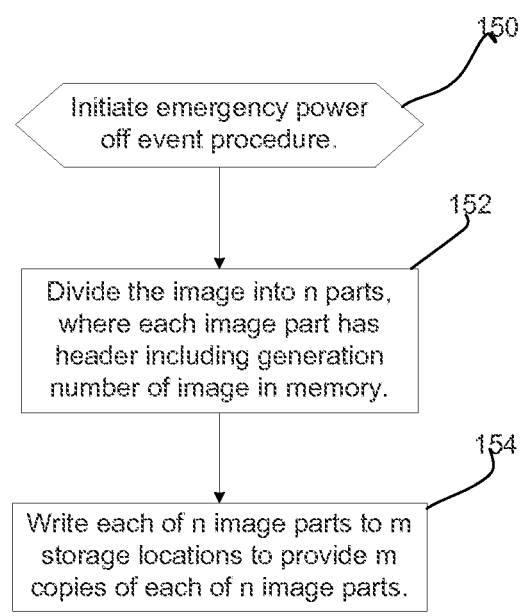
FIG. 5 illustrates an embodiment of operations to write an image to storage locations.

FIG. 5 illustrates an embodiment of operations performed by the image manager code 14 to write the image parts 8a . . . 8n to the storage locations 16a . . . 16(m*n) in response to a second event, which in the described embodiments comprises an emergency power-off event. In response to initiating a power-off event procedure (at block 150), the image manager code 14 divides (at block 152) the image into n parts. Where each image part 8a . . . 8n has a header 30 including a generation number 36 that is the generation number of the image 8 in the memory 6, Each of the n image parts is written (at block 154) to m storage locations to provide m copies of each of the n image parts in m*n or fewer storage locations. In certain occurrences, some of the storage locations 16a . . . 16(m*n) may be unavailable and, thus, not receive the image part copy having the current generation number.

With the described operations of FIGS. 4 and 5, multiple copies of the image 8 or image parts 8a . . . 8n may be stored in separate storage locations or storage devices. In this way, if one of the storage locations becomes unavailable While the current image part is being written to the storage locations, that current image part may be recovered from another copy in another storage location. If the generation number fro an image part copy is less than the check generation number for that image part, then the image part copy in the storage location has become outdated because its generation number is less than the current image generation number. This allows the image manager code 14 to determine if an image part in a storage location is outdated and cannot be used to recover the image during the image load into the memory 8.

Figure 6:
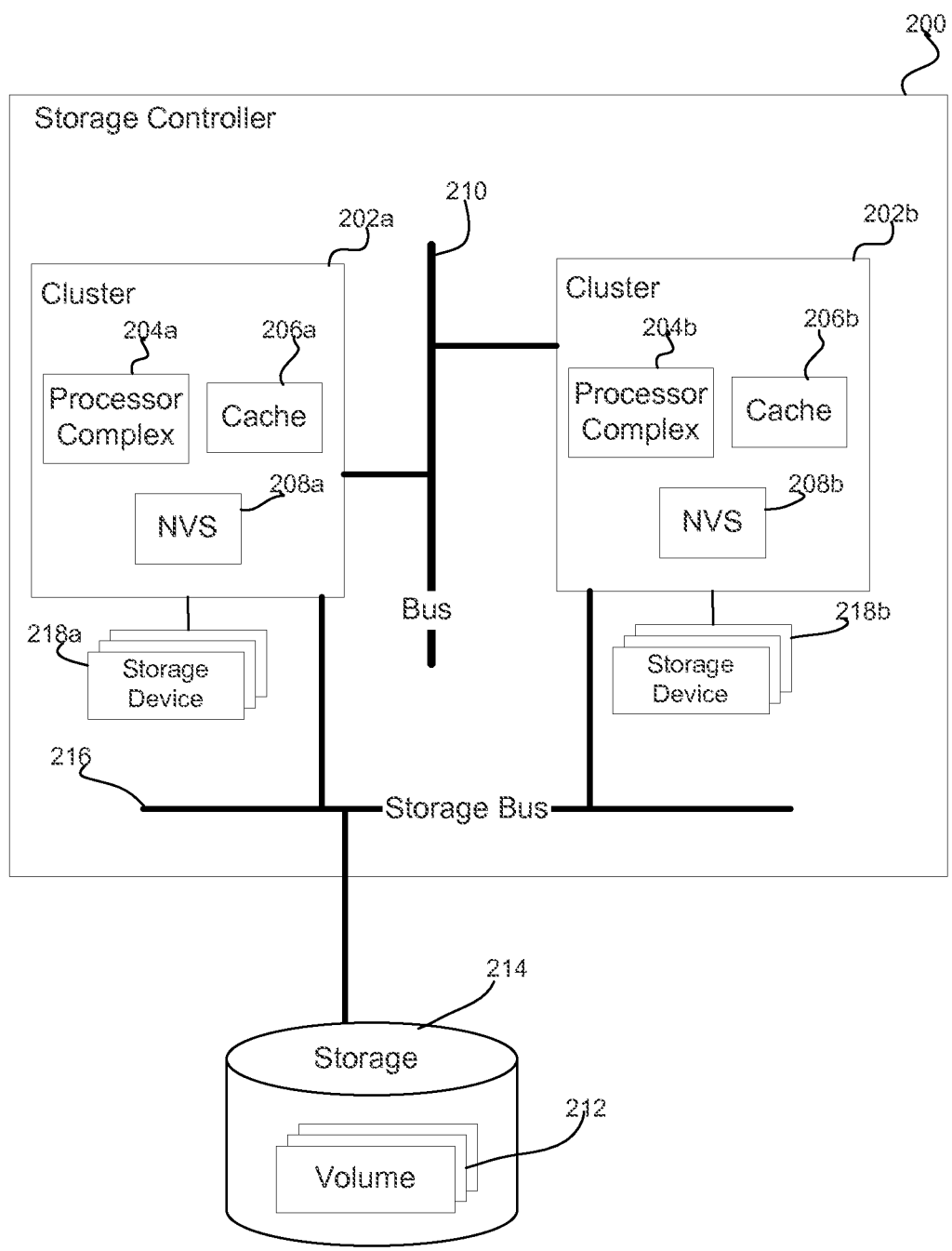
FIG. 6 illustrates an embodiment of a dual cluster storage controller environment.

FIG. 6 illustrates an embodiment of a storage controller 200 having clusters 202a, 202b, each having two processor complexes 204a, 204b, a cache 206a, 206b to cache data and Input/Output (I/O) requests, and non-volatile storages (NVSs) 208a, 208b, such that data in caches 206a and 206b is cached in the NYS 208b and 208b, respectively, in the other cluster 202a, 202b via a bus 210. Further, data from the caches 206a, 206b is destaged to volumes 212 in storage 214 via storage bus 216. In this way, each cluster 202a, 202b comprises processing systems on different power boundaries and implemented in separate hardware components, such as separate motherboards. The storage 214 may comprise an array of storage devices, such as a Just a Bunch of Disks (JBOD), Direct Access Storage Device (DASD), Redundant Array of Independent Disks (RAID) array, virtualization device, tape storage, flash memory Copies of the image maintained in the NVSs 208a, 208b may be stored in the storage devices 218a, 218b according to the operations described above with respect to FIGS. 1, 2, 3, and 4. One cluster 202a, 202b during initialization may load an image into its cache 206a, 206b from the storage devices 218b, 218a, respectively, in the other cluster 202b, 202a. The storage 214 may store the check generation numbers for the image part copies stored in the storage devices 218a, 218b. In this way, the image to load into the cache 206a, 206b for one cluster 202a, 202b is stored in another cluster. Further, each cluster 202a, 202h may store the data image of its memory 206a, 206b in the storage devices 218a, 218b of both clusters 202a, 202b.

Additional Embodiment Details

The described operations may be implemented as a method, apparatus or article of manufacture using standard programming and/or engineering techniques to produce software, firmware, hardware, or any combination thereof. The described operations may be implemented as code maintained in a "computer readable medium", where a processor may read and execute the code from the computer readable medium. A computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices. An "article of manufacture" comprises computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the present invention, and that the article of manufacture may comprise suitable information bearing medium known in the art.

In the described embodiments, the image is loaded from storage locations and the generation number incremented as part of a first event comprising a system initialization, such as an PAL, and the image is written to the storage locations in response to a second event comprising an emergency power-off event. In alternative embodiments, the first and second events may comprise events other than a system initialization and emergency power-off.

The terms "an embodiment", "embodiment", "embodiments", "the embodiment", "the embodiments", "one or more embodiments", "some embodiments", and "one, embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. in other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Simi lady, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 4 and 5 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. it is not intended to be exhaustive or to limit the invention to the precise form disclosed. Many modifications and variations are possible in tight of the above teaching. it is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. An article of manufacture comprising a computer readable storage device including code executed to communicate with a memory and storage locations and to perform:
   maintaining an image of data in a memory, wherein the image in the memory includes a generation number for the image;

writing the image in the memory to at least two copies of the image to storage locations in response to a first event, wherein the generation number for the image in the memory is stored in the storage locations having the copies;

setting check generation numbers for the copies of the image to the generation number of the image in the memory;

loading the image from at least one of the copies of the image in one of the storage locations to the memory in response to a second event;

incrementing the generation number for the image loaded into the memory from the at least one of the copies of the image;

incrementing the check generation numbers for the copies of the image in response to the second event; and using the generation numbers for the copies of the image in the storage locations and the check generation numbers of the copies of the image to validate the copies of the image.

2. The article of manufacture of claim 1, wherein using the generation numbers comprises:

comparing the generation number for each copy of the image in one of the storage locations to the check generation number for the copy of the image in response to the second event, wherein the copy of the image is not loaded from the storage location into the memory in response to determining that the generation number of the copy of the image in the storage location is less than the check generation number for the copy of the image.

3. The article of manufacture of claim 1, wherein writing the image in the memory to at least two copies comprises:

dividing the image in the memory into at least two parts of the image; and writing each part of the image to at least one of the storage locations, wherein each part of the image written to one of the storage locations includes the generation number of the image in the memory.

4. The article of manufacture of claim 3, wherein each storage location including one copy of one part of the image comprises a storage device, and wherein a storage location including the check generation number for the copy of the part of the image comprises a storage device not including any copy of any part of the image copy.

5. The article of manufacture of claim 4, wherein the memory is in a first cluster and wherein the storage devices including the copies of the parts of the image are in a second cluster.

6. The article of manufacture of claim 4, wherein each storage device includes only one copy of one part of the image.

7. The article of manufacture of claim 4, wherein the parts of the image may be loaded from any validated copy of the parts image in the storage devices.

8. The article of manufacture of claim 1, wherein the first event comprises an emergency power-off event and wherein the second event comprises a system initialization.

9. A system, comprising:

a memory including an image of data, wherein the image in the memory includes a generation number for the image;

storage locations;

a device implementing code that is operable for:

writing the image in the memory to at least two copies of the image to storage locations in response to a first event, wherein the generation number for the image in the memory is stored in the storage locations having the copies of the image;

setting check generation numbers for the copies of the image to the generation number of the image in the memory;

loading the image from at least one of the copies of the image in one of the storage locations to the memory in response to a second event;

incrementing the generation number for the image loaded into the memory from the at least one of the copies of the image;

incrementing the check generation numbers for the copies of the image in response to the second event; and using the generation numbers for the copies of the image in the storage locations and the check generation numbers for the copies of the image to validate the copies of the image.

10. The system of claim 9, wherein using the generation numbers comprises:

comparing the generation number for each copy of the image in one of the storage locations to the check generation number for the copy of the image in response to the second event, wherein the copy of the image is not loaded from the storage location into the memory in response to determining that the generation number of the copy of the image in the storage location is less than the check generation number for the copy of the image.

11. The system of claim 9, wherein writing the image in the memory to at least two copies comprises:

dividing the image in the memory into at least two parts of the image; and writing each part of the image to at least one of the storage locations, wherein each part of the image written to one of the storage locations includes the generation number of the image in the memory.

12. The system of claim 11, wherein each storage location including one copy of one part of the image comprises a storage device, and wherein a storage location including the check generation number for the copy of the part of the image comprises a storage device not including any copy of any part of the image.

13. The system of claim 12, further comprising:

a first cluster including the memory; and a second cluster including the storage devices having the copies of the parts of the image.

14. The system of claim 9, wherein the first event comprises an emergency power-off event and wherein the second event comprises a system initialization.

15. A method, comprising:

maintaining an image of data in a memory, wherein the image in the memory includes a generation number for the image;

writing the image in the memory to at least two copies of the image to storage locations in response to a first event, wherein the generation number for the image in the memory is stored in the storage locations having the copies of the image;

setting check generation numbers for the copies of the image to the generation number of the image in the memory;

loading the image from at least one of the copies of the image in one of the storage locations to the memory in response to a second event;

incrementing the generation number for the image loaded into the memory from the at least one of the copies of the image;

incrementing the check generation numbers for the copies of the image in response to the second event; and using the generation numbers for the copies of the image in the storage locations and the check generation numbers for the copies of the image to validate the copies of the image.

16. The method of claim 15, wherein using the generation numbers comprises:
   comparing the generation number for each copy of the image in one of the storage locations to the check generation number for the copy of the image in response to the second event, wherein the copy of the image is not loaded from the storage location into the memory in response to determining that the generation number of the copy of the image in the storage location is less than the check generation number for the copy of the image.

17. The method of claim 15, wherein writing the image in the memory to at least two copies comprises:
   dividing the image in the memory into at least two parts of the image; and
   writing each part of the image to at least one of the storage locations, wherein each part of the image written to one of the storage locations includes the generation number of the image in the memory.

18. The method of claim 17, wherein each storage location including one copy of one part of the image comprises a storage device, and wherein a storage location including the check generation number for the copy of the image comprises a storage device not including any copy of any part of the image.

19. The method of claim 18, wherein the memory is in a first cluster and wherein the storage devices including the copies of the parts of the image are in a second cluster.

20. The method of claim 15, wherein the first event comprises an emergency power-off event and wherein the second event comprises a system initialization.

* * * * *